US010909517B2

(12) United States Patent
Hata

(10) Patent No.: US 10,909,517 B2
(45) Date of Patent: Feb. 2, 2021

(54) REGISTRATION SETTLEMENT APPARATUS AND INFORMATION PROCESSING METHOD FOR CONTROLLING THE SAME

(71) Applicant: TOSHIBA TEC KABUSHIKI KAISHA, Tokyo (JP)

(72) Inventor: Hajime Hata, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 16/192,891

(22) Filed: Nov. 16, 2018

(65) Prior Publication Data
US 2019/0156314 A1    May 23, 2019

(30) Foreign Application Priority Data

Nov. 20, 2017 (JP) ................................ 2017-222898

(51) Int. Cl.
*G06Q 20/00* (2012.01)
*G06Q 20/20* (2012.01)
(Continued)

(52) U.S. Cl.
CPC ......... *G06Q 20/201* (2013.01); *G06K 7/1413* (2013.01); *G06Q 20/209* (2013.01);
(Continued)

(58) Field of Classification Search
CPC ... G06Q 20/201; G06Q 20/209; G06K 7/1413
(Continued)

(56) References Cited

U.S. PATENT DOCUMENTS

| 5,959,275 A * | 9/1999 | Hughes .............. G06K 17/0022 235/375 |
| 7,694,005 B2 * | 4/2010 | Reckamp ............ H04L 12/2814 709/230 |

(Continued)

FOREIGN PATENT DOCUMENTS

| JP | 2009-43185 | 2/2009 |
| WO | 2017/178843 | 10/2017 |

OTHER PUBLICATIONS

Extended European Search Report for European Patent Application No. 18207315.5 dated Mar. 27, 2019.

*Primary Examiner* — Rokib Masud
(74) *Attorney, Agent, or Firm* — Amin, Turocy & Watson, LLP

(57) ABSTRACT

A registration settlement apparatus comprises an acquiring module configured to acquire a commodity list from an external device; an input module configured to input designation of a commodity; a registering module configured to register a commodity displayed in the list as a purchased commodity if the list is acquired by the acquiring module and to register a designated commodity as a purchased commodity in a distinguishable manner from the commodity registered from the list if the designation is input by the input module; a granting module configured to grant mutually different privileges for purchase of the commodity registered as the purchased commodity by the registering module depending on whether the commodity registered from the list is contained in the commodity registered as the purchased commodity; and a settlement module configured to perform a processing for settling a price of a commodity registered as the purchased commodity by the registering module.

20 Claims, 3 Drawing Sheets

(51) Int. Cl.
*G06Q 20/32* (2012.01)
*G07G 1/00* (2006.01)
*G06K 7/14* (2006.01)
*G06Q 30/02* (2012.01)

(52) U.S. Cl.
CPC ....... *G06Q 20/322* (2013.01); *G06Q 20/3274* (2013.01); *G07G 1/0045* (2013.01); *G07G 1/0081* (2013.01); *G06Q 30/0238* (2013.01)

(58) Field of Classification Search
USPC .................................................... 705/16, 20
See application file for complete search history.

(56) References Cited

U.S. PATENT DOCUMENTS

| | | |
|---|---|---|
| 2010/0070365 A1 | 3/2010 | Siotia et al. |
| 2011/0196755 A1* | 8/2011 | Landa ................. G07G 1/0036 705/23 |
| 2014/0172621 A1 | 6/2014 | Vittolia |
| 2015/0120475 A1 | 4/2015 | Pedley et al. |

* cited by examiner

REGISTRATION SETTLEMENT APPARATUS AND INFORMATION PROCESSING METHOD FOR CONTROLLING THE SAME

CROSS-REFERENCE TO RELATED APPLICATION

This application is based upon and claims the benefit of priority from Japanese Patent Application No. 2017-222898, filed in Nov. 20, 2017, the entire contents of which are incorporated herein by reference.

FIELD

Embodiments described herein relate generally to a registration settlement apparatus and an information processing method for controlling the same.

BACKGROUND

A form in which a store clerk receives an order from a customer to provide a commodity in a retail store is widely applied in a transaction.

In a registration settlement apparatus used for such a type of transaction, a store clerk is informed about a commodity to be provided from a customer who enters the retail store and registers the commodity as a purchased commodity.

Thus, the store clerk needs to be informed about all the commodities to be purchased in one transaction one by one from the customer and then to register the commodity using the registration settlement apparatus, thereby prolonging a work time for each transaction.

Under such circumstances, it is desired to shorten the work of a commodity registration.

DETAILED DESCRIPTION

In accordance with an embodiment, a registration settlement apparatus comprises an acquiring module configured to acquire a commodity list from an external device; an input module configured to input designation of a commodity; a registering module configured to register a commodity displayed in the list as a purchased commodity if the list is acquired by the acquiring module and to register a designated commodity as a purchased commodity in a distinguishable manner from the commodity registered from the list if the designation is input by the input module; a granting module configured to grant mutually different privileges for purchase of the commodities registered as the purchased commodities by the registering module depending on whether the commodity registered from the list is contained in the commodities registered as the purchased commodities; and a settlement module configured to perform a processing for settling prices of the commodities registered as the purchased commodities by the registering module.

An example of an embodiment is described below with reference to the accompanying drawings. In the present embodiment, an order receiving system using a POS (point-of-sale) terminal as a commodity registration settlement apparatus is described as an example.

Figure 1:
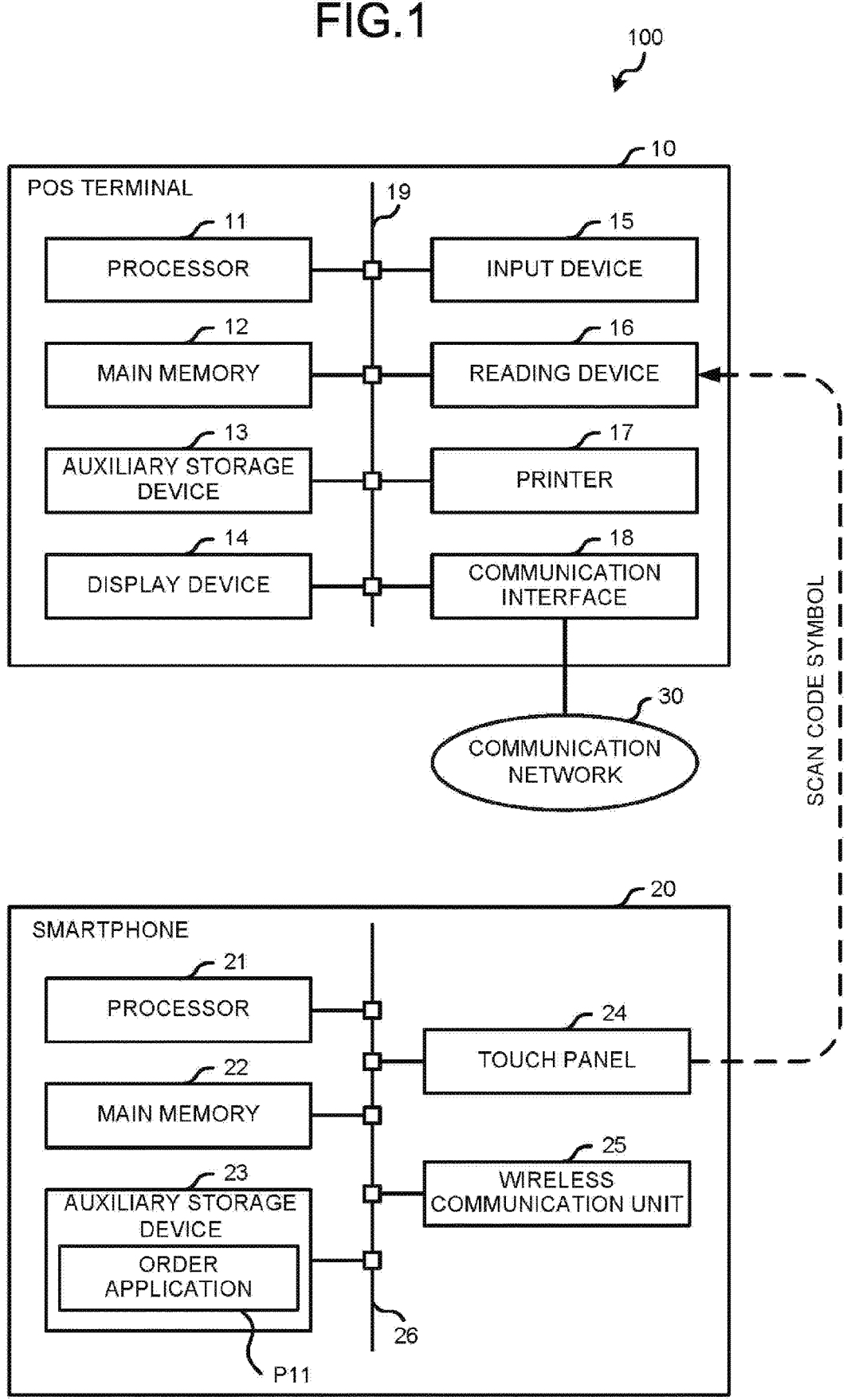
FIG. 1 is a block diagram illustrating a schematic configuration of an order receiving system according to an embodiment and a circuit configuration of main portions of a POS terminal and a smartphone included in the order receiving system.

FIG. 1 is a block diagram illustrating a schematic configuration of the order receiving system according to the present embodiment and a circuit configuration of main portions of a POS terminal and a smartphone included in the order receiving system.

An order receiving system 100 is formed by linking a POS terminal 10 and a smartphone 20.

In a transaction in a form in which a store clerk receives an order from a customer to provide a commodity in a retail store, the POS terminal 10 performs a processing for performing a purchase registration of a commodity based on the above order and settling a price of the commodity. Generally, the store clerk operates the POS terminal 10; however, a customer may operate the POS terminal 10. For example, a take-away sale of food and drink or the like is a representative for the form of the above transaction.

The smartphone 20 is a portable information terminal possessed by a customer.

The POS terminal 10 includes a processor 11, a main memory 12, an auxiliary storage device 13, a display device 14, an input device 15, a reading device 16, a printer 17, a communication interface 18, a transmission path 19, and the like. FIG. 1 mainly shows the components necessary for description of the characteristic configuration and operation of the present embodiment, and may also include another component provided in another known POS terminal of the same type or any other components.

In the POS terminal 10, the processor 11, the main memory 12, and the auxiliary storage device 13 are connected to each other via the transmission path 19 to constitute a computer for performing an information processing for controlling the POS terminal 10.

The processor 11 acts as a central part of the computer. The processor 11 executes an operating system and an application program to control each section to realize various functions of the POS terminal 10.

The main memory 12 acts as a main memory portion of the computer. The main memory 12 includes a nonvolatile memory area and a volatile memory area. The main memory 12 stores the operating system and the application program in the nonvolatile memory area. The main memory 12 may store data required to execute a processing for the processor 11 to control each section in the nonvolatile memory area or the volatile memory area in some cases. The main memory 12 uses the volatile memory area as a work area in which the data is appropriately rewritten by the processor 11.

The auxiliary storage device 13 acts as an auxiliary storage portion of the computer. The auxiliary storage device 13 is, for example, an EEPROM (electric erasable programmable read-only memory). The auxiliary storage device 13 may also be an HDD (hard disc drive), an SSD (solid state drive), or other well-known storage devices. The auxiliary storage device 13 stores data used by the processor 11 to perform various processing and data generated in a processing executed by the processor 11. The auxiliary storage device 13 may also store the application program in some cases.

The display device 14 displays various screens for providing an operator with various kinds of information. The display device 14 may be, for example, a known device such as a liquid crystal display device or the like.

The input device 15 inputs various instructions from the operator. As the input device 15, known devices such as a touch sensor or a keyboard may be used alone or in combination.

The reading device 16 reads data stored or displayed on a recording medium. As the reading device 16, known devices such as a barcode scanner or a card reader may be used alone or in combination. In the present embodiment, the reading device includes a reader capable of optically reading a code symbol described later.

The printer 17 prints a receipt image on a receipt paper to issue a receipt.

The communication interface 18 performs data communication via the communication network 30. As the communication interface 18, for example, a known device capable of performing a known processing for data communication via a LAN (local area network) may be used. The communication interface 18 establishes data communication with a POS server or the like.

The transmission path 19 includes an address bus, a data bus, a control signal line, and the like, and transmits data and control signals transmitted and received between the connected sections.

The POS terminal 10 stores the application program for realizing an information processing described later in the main memory 12 or the auxiliary storage device 13. The application program may be stored in the main memory 12 or the auxiliary storage device 13 when hardware of the POS terminal 10 is transferred, or may be transferred separately from the above hardware. In the latter case, the application program is transferred via a network or recorded in a removable recording medium such as a magnetic disk, a magneto-optical disk, an optical disk, a semiconductor memory, etc. In the latter case, it is assumed that the information processing program is provided as a version upgrade program and is used in place of another information processing program of the same type already stored in the main memory 12 or the auxiliary storage device 13.

The smartphone 20 includes a processor 21, a main memory 22, an auxiliary storage device 23, a touch panel 24, a wireless communication unit 25, a transmission path 26, and the like. FIG. 1 mainly shows the components necessary for description of the characteristic configuration and operation of the present embodiment, and may also include another component provided in another known smartphone of the same type or any other components.

In the smartphone 20, the processor 21, the main memory 22, and the auxiliary storage device 23 are connected to each other via the transmission path 26 to constitute a computer that performs an information processing for controlling the smartphone 20.

The processor 21 acts as a central part of the computer. The processor 21 executes an operating system and an application program to control each section to realize various functions of the smartphone 20.

The main memory 22 acts as a main memory portion of the computer. The main memory 22 includes a nonvolatile memory area and a volatile memory area. The main memory 22 stores the operating system and the application program in the nonvolatile memory area. The main memory 22 may store data required to execute a processing for the processor 21 to control each section in the nonvolatile memory area or the volatile memory area in some cases. The main memory 22 uses the volatile memory area as a work area in which the data is appropriately rewritten by the processor 21.

The auxiliary storage device 23 acts as an auxiliary storage portion of the computer. The auxiliary storage device 23 is, for example, an EEPROM. The auxiliary storage device 23 may also be an HDD, an SSD, or the like. The auxiliary storage device 23 stores data used by the processor 21 to perform various processing and data generated in a processing executed by the processor 21. The auxiliary storage device 23 may also store the application program.

One of the application programs stored in the auxiliary storage device 23 is an information processing program (hereinafter, referred to as an order application) P11 for realizing the information processing described later. Typically, the order application P11 is downloaded via, for example, the Internet to be written into the auxiliary storage device 23 in response to an operation performed by a user of the smartphone 20. In other words, the access of the smartphone 20 by the user of the smartphone 20 is performed in a state in which the order application P11 is not stored in the auxiliary storage device 23. However, the smartphone 20 may be accessed by the user of the smartphone 20 in a state in which the order application P11 is stored in the auxiliary storage device 23.

The touch panel 24 functions as an input device and a display device of the smartphone 20.

The wireless communication unit 25 performs data communication via a wireless communication network. As the wireless communication unit 25, for example, a known communication device for performing data communication via a mobile communication network may be used.

The transmission path 26 includes an address bus, a data bus, a control signal line, and the like, and transmits data and control signals transmitted and received between the connected sections.

Next, the operation of the order receiving system 100 configured as described above is described.

A customer who wants to purchase a commodity in a retail store performs operation to start the order application P11 with the smartphone 20 possessed by himself/herself before going to the retail store. Then, the processor 21 executes the following information processing by executing the order application P11.

Figure 2:
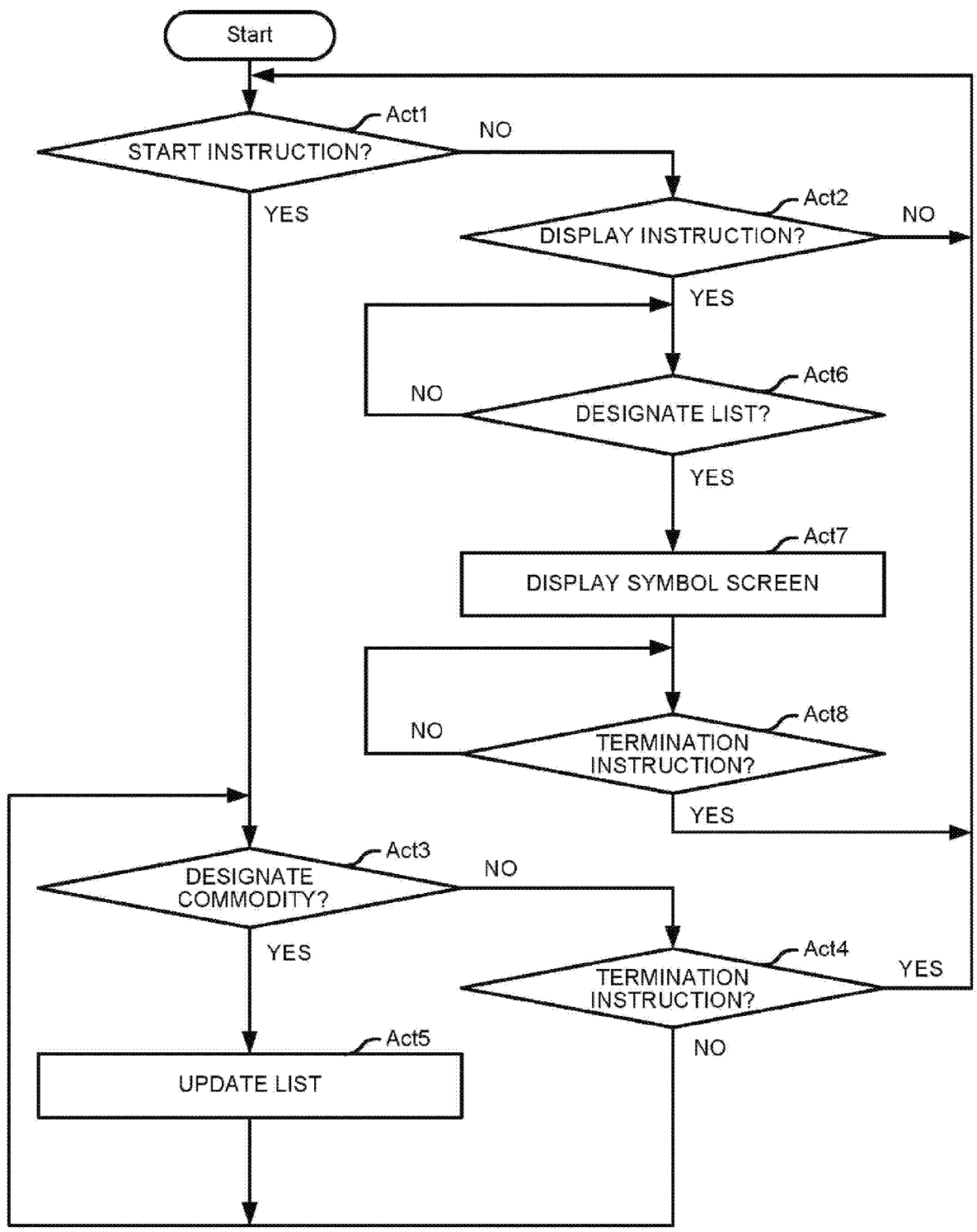
FIG. 2 is a flowchart depicting an information processing executed by a processor of the smartphone in FIG. 1 by executing an order application.

FIG. 2 is a flowchart depicting an information processing executed by the processor 21 by executing the order application P11. The content of the processing described below is merely an example, and various processing capable of achieving the same result can be appropriately used.

In Act 1, the processor 21 determines whether or not the start of list creation is instructed. Then, if the start is not instructed, the processor 21 determines No, and proceeds to the processing in Act 2.

In Act 2, the processor 21 determines whether or not a display of a code symbol is instructed. Then, if the display is not instructed, the processor 21 determines No, and returns to the processing in Act 1.

In this way, the processor 21 stands by until the start is instructed in Act 1 or the display is instructed in Act 2. The processor 21 displays a home screen on the touch panel 24 before shifting to the standby state. The home screen shows an image for notifying a customer that it is in the standby state. The home screen shows buttons for issuing the start instruction and the display instruction, respectively. If a list of commodities to be purchased in the retail store is created from now on, the customer touches the button for issuing the start instruction. In response to this, the processor 21 determines Yes in Act 1 and proceeds to the processing in Act 3.

In Act 3, the processor 21 determines whether or not a commodity is designated. If no commodity is designated, the processor 21 determines No and proceeds to the processing in Act 4.

In Act 4, the processor 21 determines whether or not the termination of the list creation is instructed. Then, if the termination is not instructed, the processor 21 determines No, and returns to the processing in Act 3.

In this way, the processor 21 stands by until the commodity is designated in Act 3 or the termination is instructed in Act 4. Prior to shifting to the standby state, the processor 21 displays a designation screen on the touch panel 24. The designation screen is a GUI (graphical user interface) for allowing the customer to browse information of commodities being sold in the retail store and receiving designation of a commodity to be purchased from those commodities. The designation screen includes a button for instructing the termination of list creation. While confirming the commodities being sold in the retail store on the designation screen, the customer performs an operation to designate the commodity he/she wants to purchase. In response to this, the processor 21 determines Yes in Act 3 and proceeds to the processing in Act 5.

In Act 5, the processor 21 updates a list so as to include the designated commodity as described above. Specifically, the processor 21 creates list data in the main memory 22 or the auxiliary storage device 23 at the time of executing the processing in Act 5 for the first time after shifting to the standby state in Act 1 to Act 3 and Act 4. At this time, if another list data is already stored in the main memory 22 or the auxiliary storage device 23, the processor 21 does not erase the list data. Then, the processor 21 manages the plurality of the list data in association with list codes determined to be distinguishable from other list data. However, the processor 21 may overwrite the list data that is already stored with new list data. The list data includes a commodity code for identifying the designated commodity. At the time of executing the processing in Act 5 for the second time or later, the processor 21 adds the commodity code of the newly designated commodity to the above list data. If the processor 21 completes the update of the list, the processor 21 returns to the standby state in Act 3 and Act 4. Thus, if the customer designates the commodity over and over again, the list data becomes data indicating a list of the commodity codes of those commodities. In the following, the list is referred to as a schedule list.

If the customer completes designation of all the commodities to be purchased, the customer instructs the termination by touching the button for instructing the termination. In response to this, the processor 21 determines Yes in Act 4 and returns to the standby state in Act 1 and Act 2.

If the customer goes to the retail store, the customer instructs the display of the code symbol by touching the button for instructing the display on the home screen. In response to this, the processor 21 determines Yes in Act 2 and proceeds to the processing in Act 6.

In Act 6, the processor 21 stands by until a list is designated. Before shifting to the standby state, the processor 21 displays a selection screen on the touch panel 24. The selection screen is a GUI for allowing the customer to browse the list indicated by the list data stored in the main memory 22 or the auxiliary storage device 23 and to select one of the lists. While confirming the list on the selection screen, the customer designates a list of commodities he/she wants to purchase in the retail store from now on. In response to this, the processor 21 determines Yes in Act 6 and proceeds to the processing in Act 7.

In Act 7, the processor 21 displays a symbol screen on the touch panel 24. Specifically, the processor 21 generates a code symbol indicating character strings for showing all the commodity codes included in the designated list in a predetermined format, and displays a symbol screen including the code symbol on the touch panel 24. The code symbol indicates the character strings in such a manner that it is optically readable in conformity with a predetermined standard. Although any standard may be applied for the code symbol, it is assumed that a QR Code® is used. The processor 21 displays a button for instructing termination of the display of the symbol screen on the symbol screen.

The customer presents the smartphone 20 on which the symbol screen is displayed to the store clerk. Then, if the code symbol shown on the symbol screen is read as described later, the customer instructs the termination of the display by touching the button for instructing the termination of the display.

In a state in which the symbol screen is displayed on the touch panel 24, the processor 21 stands by until the termination is instructed. Then, if the termination is instructed as described above, the processor 21 determines Yes and returns to the standby state in Act 1 and Act 2.

On the other hand, when the POS terminal 10 is operating in an operation mode for performing the purchase registration and the settlement on the commodity, the processor 11 executes the application program stored in the main memory 12 or the auxiliary storage device 13 to execute an information processing as follows.

Figure 3:
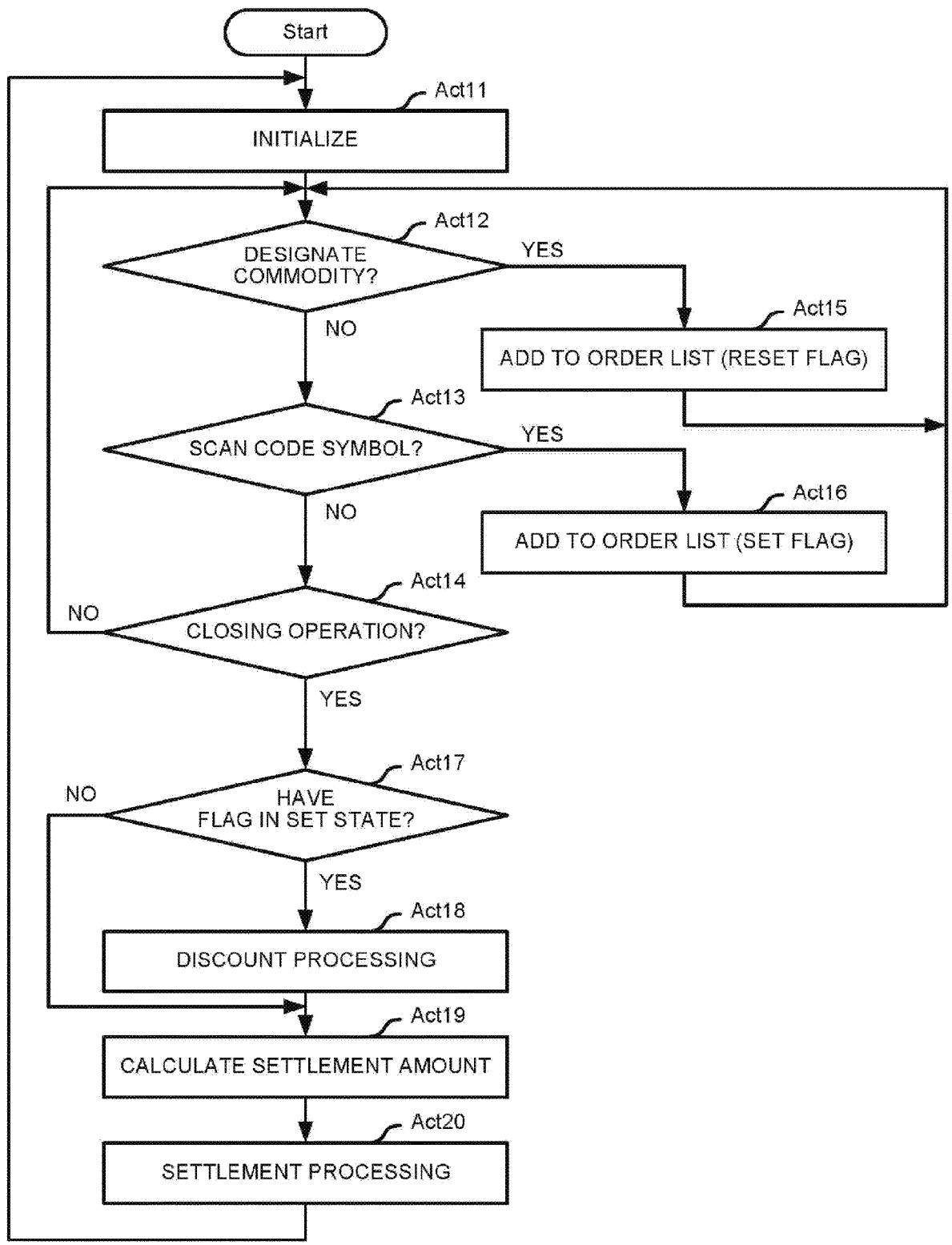
FIG. 3 is a flowchart depicting an information processing executed by a processor of the POS terminal in FIG. 1.

FIG. 3 is a flowchart depicting an information processing executed by the processor 11. The content of the processing described below is merely an example, and various processing capable of achieving the same result can be appropriately used.

In Act 11, the processor 11 performs initialization such as clearing an order list. The order list is a list of commodity codes for identifying commodities to be purchased in one transaction. The order list contains flags associated with respective commodity codes. The order list may be stored in either the main memory 12 or the auxiliary storage device 13.

In Act 12, the processor 11 determines whether or not the commodity is designated. Then, if no commodity is designated, the processor 11 determines No, and proceeds to the processing in Act 13.

In Act 13, the processor 11 determines whether or not the code symbol is scanned. Then, if no code symbol is scanned, the processor 11 determines No, and proceeds to the processing in Act 14.

In Act 14, the processor 11 determines whether or not a closing operation is performed. Then, if the closing operation is not performed, the processor 11 determines No and returns to the processing in Act 12.

In this way, the processor 11 stands by until the commodity is designated in Act 12, or the code symbol is scanned in Act 13, or the closing operation is performed in Act 14.

If the customer notifies the store clerk of an ordered commodity, the store clerk performs a predetermined operation for designating the commodity. The operation is an operation of pressing or touching a button associated with the commodity code of the ordered commodity provided in the input device 15 or an operation of enabling the reading device 16 to read a barcode indicating the commodity code of the ordered commodity. Thus, the input device 15 and the reading device 16 are an example of an input module or an input device for inputting designation of the commodity.

If the ordered commodity is designated by the operation as described above in the standby state of Act 12 to Act 14, the processor 11 determines Yes in Act 12 and proceeds to the processing in Act 15.

In Act 15, the processor 11 adds the commodity code of the designated commodity to the order list. At this time, the processor 11 sets a flag associated with the added commodity code to a reset state. After that, the processor 11 returns to the standby state in Act 12 to Act 14.

If the customer orders a commodity included in the schedule list generated by the smartphone 20 as described above, the customer presents the smartphone 20 in a state of displaying the symbol screen as described above to the store clerk. The store clerk then uses the reading device 16 to read the code symbol shown on the symbol screen. In response to the operation by the store clerk, the reading device 16 reads the code symbol shown on the symbol screen. If the reading device 16 scans the code symbol in response to that operation, the processor 11 determines Yes in Act 13 and proceeds to the processing in Act 16.

In Act 16, the processor 11 adds all the commodity codes included in the schedule list indicated by the code symbol scanned by the reading device 16 to the order list. At this time, the processor 11 sets the flag associated with the added commodity code to a set state. After that, the processor 11 returns to the standby state in Act 12 to Act 14. Thus, the reading device 16 as an acquiring device optically reads the code symbol to acquire the data, and the processor 11 extracts schedule list from the data. As a result, the processor 11 executes the information processing by executing the information processing program, and in this way, the computer with the processor 11 as the central part functions as an extracting module.

As described above, the flag indicates whether the associated commodity code is designated based on the informing from the customer in the retail store or whether the associated commodity code is acquired by reading the code symbol from the smartphone 20.

The store clerk repeatedly designates the commodity based on the informing and scans the code symbols as appropriate to add the commodity code of the commodity ordered by the customer to the order list. If the clerk completes addition of all the commodity codes, the store clerk performs a closing operation. The closing operation is, for example, an operation of pressing or touching a closing button provided in the input device 15. Then, if the closing operation is performed, the processor 11 determines Yes in Act 14, and proceeds to the processing in Act 17.

In Act 17, the processor 11 determines whether or not the flag in the set state is included in the order list. Then, if the flag in the set state is included, the processor 11 determines Yes, and proceeds to the processing in Act 18.

In Act 18, the processor 11 performs a discount processing. Specifically, the processor 11 sets a selling price in current transaction of the commodity identified by the commodity code associated with the flag in the set state to an amount obtained by reducing a predetermined discount amount or discount rate from a normal selling price of the commodity. The discount amount or the discount rate may be the same value regardless of the commodity, or may be values individually set for each commodity. Specifically, the processor 11 acquires the normal selling price, which is recorded in a commodity master database, corresponding to the commodity code included in the order list. The processor 11 determines the discount amount or discount rate to be applied to the corresponding commodity. Then, the processor 11 calculates the current selling price by reducing the determined discount amount or discount rate from the above acquired normal selling price. The commodity master database may be stored in the main memory 12 or the auxiliary storage device 13, or may be stored in a storage device provided in an external device such as a POS server capable of communicating with the POS terminal via the communication network 30. If the processor 11 completes the calculation of the current selling price for all of the commodities identified by the commodity codes associated with the flag in the set state, the processor 11 proceeds to the processing in Act 19. If the flag in the set state is not included in the order list, the processor 11 determines No in Act 17, and proceeds to the processing in Act 19 without executing the processing in Act 18.

In Act 19, the processor 11 calculates a settlement amount relating to the provision of all the commodities identified by the commodity codes included in the order list. Specifically, the processor 11 calculates the settlement amount as a sum of the normal selling prices of respective commodities identified by the commodity codes associated with the flag in the reset state and the selling prices of respective commodities identified by the commodity codes associated with the flag in the set state after performing the discount processing as described above. Specifically, for example, the processor 11 respectively acquires the normal selling prices, which are recorded in the commodity master database, corresponding to the commodity codes associated with the flag in the reset state. Then, for example, the processor 11 calculates the sum of the acquired normal selling prices and the selling prices calculated in Act 18. As a result, a privilege such as a discount is granted only to the commodity added to the order list from the schedule list, which means that different privileges are granted to the commodity added to the order list from the schedule list and to the other commodities, respectively. Thus, the processor 11 executes the information processing by executing the information program, and in this way, the computer with the processor 11 as the central part functions as a granting module for granting such privileges. The processor 11 may calculate the settlement amount by executing a discount processing different from that in Act 18 on the above sum.

In Act 20, the processor 11 performs a settlement processing for settling the settlement amount calculated in Act 19. The settlement processing may be a known settlement processing using the cash, the credit card, the debit card, the electronic money, points, or the like without any change. Thus, the processor 11 executes the information processing by executing the information processing program, and in this way, the computer with the processor 11 as the central part functions as a settlement module. If the settlement is completed, the processor 11 returns to the processing in Act 11 to prepare for the start of the processing on a next new transaction.

As described above, according to the order receiving system 100, all of the commodities included in the schedule list generated by the smartphone 20 can be added to the order list by scanning the code symbols. As a result, it is possible to shorten the work of the commodity registration when compared with a case in which the store clerk is informed from the customer about each commodity included in the schedule list and then performs the purchase registration on the commodity.

According to the order receiving system 100, the commodity designated in the POS terminal 10 can also be added to the order list. As a result, even when the purchase registration from the schedule list generated by the smartphone 20 is performed, it is possible to receive an additional order in the retail store. As a result, it is possible to reduce a sense of resistance of the customer to the operation of making an order using the schedule list, thereby improving coefficient of utilization of the order using the schedule list. As the coefficient of utilization of the order using the schedule list is improved, the effect of shortening the work of the commodity registration can be increased.

Furthermore, according to the order receiving system 100, in the POS terminal 10, the discount processing in Act 18 is performed on the commodity identified by the commodity code added from the schedule list into the order list, and the discount processing is not performed on the commodity ordered in the retail store. For this reason, the customer can receive special discount by using order using the schedule list, which is a motivation for using the order using the schedule list. If the coefficient of utilization of the order using the scheduled list is improved, the effect of shortening the work of the commodity registration is increased.

The embodiment can be modified as follows.

The content of discount in Act 18 in FIG. 3 can be arbitrarily changed. As an example, a predetermined discount amount may be reduced from the sum of the normal selling prices of all the commodities identified by the commodity codes associated with the flag in the set state. As another example, the discount may be performed only for a commodity that satisfies a predetermined condition among the commodities identified by the commodity codes associated with the flag in the set state.

The way of granting the privilege can be arbitrarily changed. As an example, points may be granted only for the commodity identified by the commodity code associated with the flag in the set state. As another example, a right to receive a present may be granted only for the purchase of the commodity identified by the commodity code associated with the flag in the set state.

The privilege may also be granted for the commodity identified by the commodity code associated with the flag in the reset state. However, the privilege is disadvantageous to the customer when compared with the privilege granted for the commodity identified by the commodity code associated with the flag in the set state.

The schedule list may be imported into the POS terminal 10 by wireless communication such as a NFC (near field communication), infrared communication, or the like.

The processor 11 may additionally determine whether or not a deletion is instructed in the standby state in Act 12 to Act 14 in FIG. 3, and delete a commodity code included in the order list in response to the deletion instruction from the operator.

The registration settlement apparatus may be any other apparatus such as a cash register in place of the POS terminal 10. The POS terminal 10 may be of a self-service type or a semi-self-service type.

The portable information terminal may be any other apparatus such as a tablet terminal or a portable personal computer in place of the smartphone 20.

A part or all of the functions may be realized by the processor 11 or the processor 21 executing the information processing may be realized by hardware such as a logic circuit or the like for executing the information processing which is not based on a program. Each of the above-described functions may also be realized by combining software control with the hardware such as the above logic circuit.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A registration settlement apparatus, comprising:
   an acquisition module configured to acquire a schedule list from an external device, wherein the schedule list is generated by the external device and comprises one or more commodities identified prior to an interaction between the external device and the registration settlement apparatus;
   an input module configured to input designation of at least one commodity separate from the one or more commodities in the schedule list, resulting in at least one designated commodity;
   a registration module configured to register the one or more commodities in the schedule list as first purchased commodities and the at least one designated commodity as second purchased commodities;
   a granting module configured to grant mutually different privileges for purchase of the first purchased commodities and the second purchased commodities; and
   a settlement module configured to perform a processing for settling prices of the first purchased commodities and the second purchased commodities.

2. The registration settlement apparatus according to claim 1, wherein
   the acquisition module is further configured to acquire the schedule list stored in the external device from data obtained by optically reading a code symbol displayed on the external device, wherein the external device is a portable information terminal.

3. The registration settlement apparatus according to claim 1 is a point of sale terminal.

4. The registration settlement apparatus according to claim 3, wherein
   the point of sale terminal comprises a reading device that reads a symbol from a smart phone display, wherein the symbol comprises respective commodity codes of the one or more commodities included in the schedule list.

5. The registration settlement apparatus according to claim 1, wherein
   the external device is a smart phone.

6. The registration settlement apparatus according to claim 1, wherein
   the external device is a portable personal computer.

7. The registration settlement apparatus according to claim 1, wherein
   the external device is a tablet terminal.

8. The registration settlement apparatus according to claim 1, wherein
   the interaction between the external device and the registration settlement apparatus is a data communication via a wireless communication network.

9. The registration settlement apparatus according to claim 1, further comprising a printer.

10. An information processing method for executing an information processing to control a registration settlement apparatus which comprises an acquisition device for acquiring a commodity list from an external device and an input device for inputting designation of a commodity, comprising:
- extracting the commodity list from data acquired from the external device by the acquisition device, wherein the commodity list comprises one or more commodities;
- registering a first commodity from the one or more commodities in the commodity list as a purchased commodity;
- registering a second commodity as a purchased commodity in a distinguishable manner from the first commodity, wherein the second commodity is different from the one or more commodities in the commodity list;
- granting mutually different privileges for a first purchase of the first commodity and a second purchase of the second commodity; and
- performing a processing for settling prices of the first purchase of the first commodity and the second purchase of the second commodity.

11. The information processing method according to claim 10, further comprising:
- acquiring the commodity list stored in the external device from data obtained by optically reading a code symbol displayed on the external device.

12. The information processing method according to claim 10, wherein
different privileges of the mutually different privileges include discounts.

13. The information processing method according to claim 10, further comprising:
printing a receipt.

14. The information processing method according to claim 10, wherein
registering the second commodity as the purchased commodity comprises flagging the second commodity as a commodity designated based on reading information directly from the second commodity during a purchase of the second commodity.

15. The information processing method according to claim 10, further comprising:
reading a symbol from a smart phone display, wherein the symbol comprises respective commodity codes of the one or more commodities included in the commodity list.

16. An order receiving system, comprising:
a portable information terminal comprising:
- an order application executing on the portable information terminal, wherein the order application is configured to acquire a commodity list that comprises data indicating respective commodity codes of commodities included in the commodity list; and
- a communication unit configured to communicate the respective commodity codes as a schedule list; and a POS terminal comprising:
- a registration module configured to register the commodities in the commodity list as purchased commodities and to register a designated commodity, not included in the schedule list, in a distinguishable manner from the purchased commodities;
- a granting module configured to grant mutually different privileges for the commodities registered as the purchased commodities and the designated commodity; and
- a settlement module configured to perform a processing for settling prices of the purchased commodities and the designated commodity.

17. The order receiving system according to claim 16, wherein the POS terminal further comprises
an acquisition module configured to acquire the commodity list stored in the portable information terminal from data obtained by optically reading a code symbol displayed on the portable information terminal.

18. The order receiving system according to claim 16, wherein
the portable information terminal a smart phone.

19. The order receiving system according to claim 18, wherein
the POS terminal comprises a reading device to read a symbol from a smart phone display.

20. The order receiving system according to claim 16, wherein
the portable information terminal is a portable personal computer.

* * * * *